United States Patent
Waldron

[11] 3,893,622
[45] July 8, 1975

[54] FOG GENERATOR

[75] Inventor: David W. Waldron, Valdosta, Ga.

[73] Assignee: Lowndes Engineering Co., Inc., Valdosta, Ga.

[22] Filed: Jan. 14, 1974

[21] Appl. No.: 433,201

Related U.S. Application Data

[60] Division of Ser. No. 216,396, Jan. 10, 1972, abandoned, which is a continuation-in-part of Ser. No. 20,364, March 17, 1970, Pat. No. 3,633,855.

[52] U.S. Cl. ............... 239/77; 239/172; 239/176; 285/90; 285/169; 285/181
[51] Int. Cl. ........................................... A01m 17/00
[58] Field of Search ............ 239/77, 172, 176, 366, 239/587, 433, 434, 601; 137/615; 285/169, 285/181, 185, 90, 404

[56] References Cited
UNITED STATES PATENTS

| | | | |
|---|---|---|---|
| 2,554,514 | 5/1951 | Wright et al. | 285/185 X |
| 2,613,109 | 10/1952 | Walker | 239/77 |
| 2,635,920 | 4/1953 | Boyce | 239/77 |
| 2,661,239 | 12/1953 | Tirrell | 239/587 X |
| 3,216,664 | 11/1965 | Wolford et al. | 239/77 |
| 3,446,424 | 5/1969 | Wolford | 239/77 X |
| 3,460,857 | 8/1969 | Larkin | 285/181 X |
| 3,722,817 | 3/1973 | Fletcher | 239/77 |

FOREIGN PATENTS OR APPLICATIONS

| | | | |
|---|---|---|---|
| 320,294 | 10/1929 | United Kingdom | 239/587 |
| 713,206 | 8/1954 | United Kingdom | 239/77 |

Primary Examiner—Lloyd L. King
Assistant Examiner—Andres Kashnikow
Attorney, Agent, or Firm—Newton, Hopkins & Ormsby

[57] ABSTRACT

A universal mounting structure for supporting a fog generator discharge head used in applying insecticides. The universal mounting structure includes a first conduit constructed of a pair of right angularly disposed conduit portions for defining an entrance passageway and a transfer passageway, with one of the conduit portions connecting the conduit to fog generator air blower. The universal mounting structure includes a second conduit constructed of a pair of right angularly disposed conduit portions for defining a transfer passageway and an exit passageway. The second conduit is connected to the first conduit so that adjacent conduit portions are coaxially aligned with each other for angular adjustment about a vertically disposed axis and includes a lock for securing the second conduit means in a selected angularly adjusted position relative to the first conduit. The second conduit exit passageway is constructed of a first conduit section connected in flow communication with the transfer passageway and a second conduit section coaxially connected to the first conduit section for angular adjustment about a substantially horizontally disposed axis and includes to tension rod for locking the second conduit section in a selected angularly adjusted position relative to the first conduit section. The second conduit section is provided with an exit port having a mounting plate supporting a fog generator discharge head.

12 Claims, 2 Drawing Figures

FOG GENERATOR

CROSS REFERENCE TO RELATED APPLICATION

This application is a division of Ser. No. 216,396 filed Jan. 10, 1972, (now abandoned), which application is in turn a continuation-in-part of Ser. No. 20,364, filed Mar. 17, 1970, now U.S. Pat. No. 3,633,855. This application is also a companion application to application Serial No. 419,925 filed Nov. 29, 1973 and application Ser. No. 442,866 filed Feb. 15, 1974.

BACKGROUND OF THE INVENTION

This invention relates to apparatus for applying insecticide by introducing minute quantities of insecticides into a spirally directed air pressure means. More particularly, the present invention is concerned with a universal mounting structure for supporting the discharge head of a fog generator so that the discharge head can be rotatably adjusted through 360° about a vertically and horizontally disposed axes.

In the past, insecticides, pesticides, fungicides and other chemicals have been spread over a large outdoor area by being dispersed in a liquid carrier, such as diesel oil, and entrained in a stream of hot air. This liquid mixture, which has only about 5 to 6 percent active ingredients, is usually transported for application in a large tank holding 350 to 400 gallons operated in conjunction with a fogging machine.

These prior art fogging machines usually consist of a burner which generates a blast of air, a nozzle arrangement for mixing the liquid from the tank and directing this aerosol outwardly. Since the liquid mixture of oil and active ingredient formed relatively large droplets in the thus produced fog which caused rapid settling of the droplets, high operating pressures, and high discharge velocities were required if the fog was to carry for any appreciable distance. Moreover, the relatively large droplets cause spotting for protective coatings on various objects and burning of foliage on plants.

Due to the bulk of the liquid mixture and the large quantities of fuel needed to heat the air, large and expensive special equipment was needed to carry the fogging machines. Except for serving as a carrier to discharge the active ingredient, there appears to be little, if any, need for the diesel oil so that it is essentially wasted and only contributes to pollution as well as spotting of protective coating and burning of foliage.

Also, recent test results have shown that the droplet size in a fog containing an active ingredient liquid changes the effective killing power of the active ingredient on insecticides. It has been found that the optimum droplet size is 5 to 20 microns mass medium diameter, much smaller than achieved with prior art fogging machines.

Applicant's above-mentioned co-pending application is directed to a relatively small compact fogging apparatus which will dispense, in finely divided form, ultra-small quantities of the concentrated active ingredient liquids or fluids, without the necessity of dissolving this ingredient in a liquid carrier. Thus, no large tank is necessary in this apparatus, and the expense, undesirable bulkiness and pollution effects of the diesel oil are eliminated while, at the same time, the power necessary to dispense a prescribed quantity of active ingredient is greatly reduced. The basic feature of applicant's above-mentioned co-pending application is directed to a discharge head for mixing minute quantities of the active insecticide ingredient with a spirally directed stream of air pressure for producing a fog containing finely dividing ultra-small quantities of the concentrated active ingredient.

One problem with applicant's above-mentioned fog generating apparatus resulted from the relatively fixed location of the discharge head which did not permit adjustment to selected angular disposed positions.

SUMMARY OF THE INVENTION

The above disadvantages of the above prior art have been overcome by the present invention which basically includes a mounting structure for connecting a fog generating discharge head onto air blower means, wherein the discharge head can be adjusted 360° about a horizontal axis and can be adjusted 360° about a vertical axis, to provide a universal mounting structure for supporting the discharge head at a number of selected angularly disposed positions.

The universal mounting structure of the present invention basically includes a first and second conduit means, with each of the conduit means being constructed of right angularly disposed conduit portions. One of the conduit portions is provided with means for connection with fog generator air blower means and a second conduit portion being provided with means for supporting a fog generator discharge head.

One important feature of the present invention is the connection of the right angularly disposed conduit portions relative to each other whereby the discharge head can be adjusted through 360° about a vertical axis and the construction of the second conduit means which will permit adjustment through 360° about a horizontal aixs.

It is therefore a primary object of the present invention to provide a universal mounting structure for supporting a fog generator discharge head used in applying insecticides.

A further object of the present invention is to provide a universal mounting structure which will provide a seal passageway for directing pressure therethrough while permitting universal adjustment of a supported discharge head.

An additional object of the present invention is to provide a universal mounting structure for supporting a fog generator discharge head which is simple in construction, economical to manufacture and reliable in performance.

These and other objects and advantages of the details of construction will become apparent upon reading the following description of a universal mounting structure embodying the principles of the present invention, with reference to the attached drawings wherein like reference numerals have been used to refer to like parts throughout the several figures, and wherein:

DESCRIPTION OF THE ILLUSTRATIVE EMBODIMENT

Figure 1:
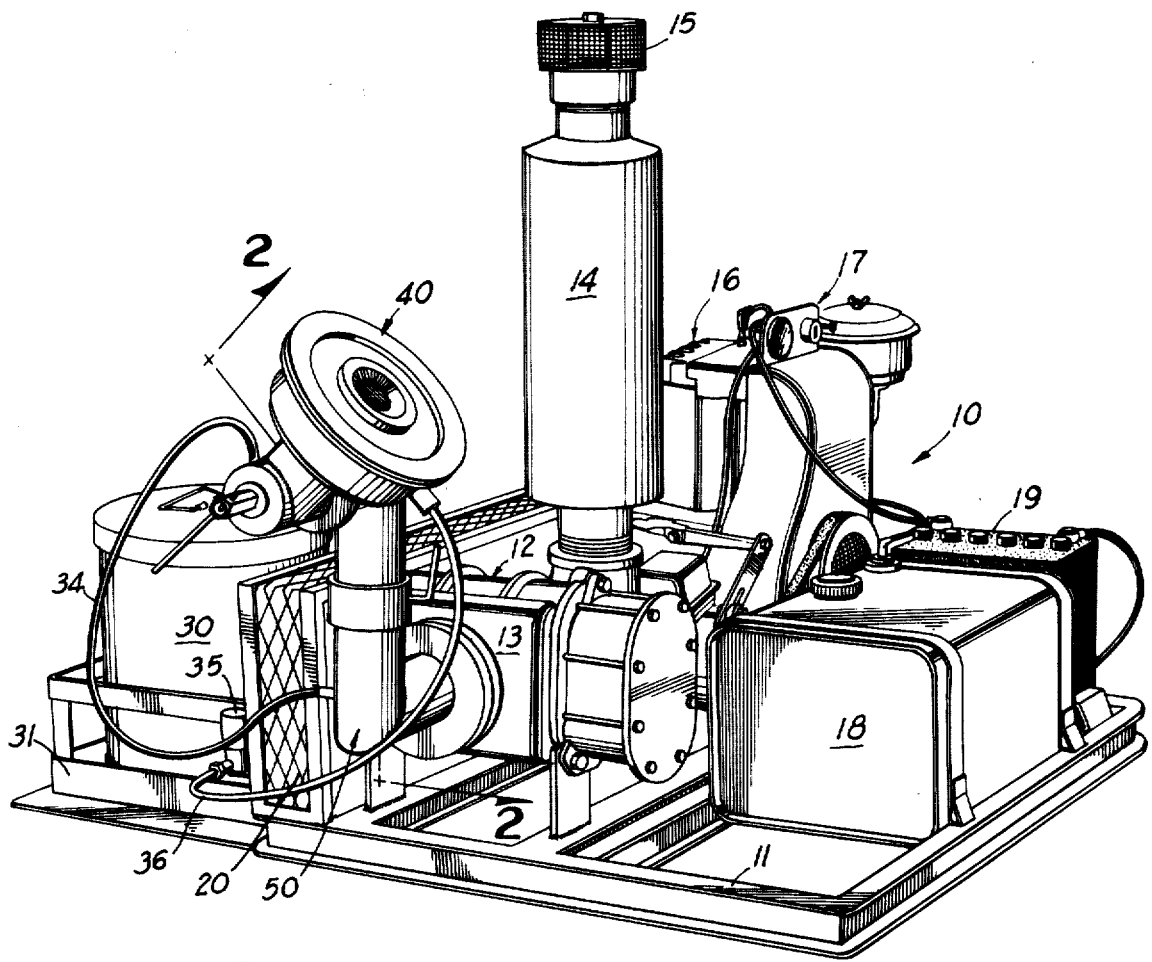
FIG. 1 is a perspective view of a fog generator utilizing a universal mounting structure embodying the principles of the present invention; and, FIG. 2 is an enlarged sectional view taken along lines 2—2 of FIG. 1 with certain parts omitted for purpose of clarity.

Referring now to the drawing, the fog generator embodying the principles of the present invention is shown and generally represented by the reference numeral 10. The fog generator includes a substantially rectangular base frame 11 constructed of conventional metal stock material operable for supporting air pressure developing means 12 having an air plenum chamber 13. The air plenum chamber 13 includes an intake silencer 14 having a filter inlet opening 15. The air pressure developing means 12 is driven by a conventional gas powered motor means 16 having a conventional start, stop and regulation control means 17. Fuel for motor 16 is contained within a supply tank 18. A battery 19 is provided for furnishing motor to conventional electric starter (not shown) on the motor 16 and for furnishing power to the electric control means on the fog generator. The air pressure developing means includes a conventional rotary fan means driven by motor 16 and is provided with a protective grill means 20.

As shown in FIG. 1, insecticide to be used in a fog generating operation is contained within a cylindrical upright supply tank 30 supported on a rectangular base frame 31. The insecticide contained within supply means 30 is delivered at a controlled rate to the fog generator discharge head 40. Reference is made to applicant's above-mentioned co-pending application for details of construction of the discharge head 40.

The discharge head 40 is supported so that air pressure developed within the air plenum chamber can be directed outwardly through the discharge head 40. The discharge head is supported for 360° angular adjustment about a substantially vertical axis and 360° adjustment about a substantially horizontal axis. The discharge head 40 is mounted on the air plenum chamber by a universal mounting structure generally represented by the reference numeral 50.

Figure 2:
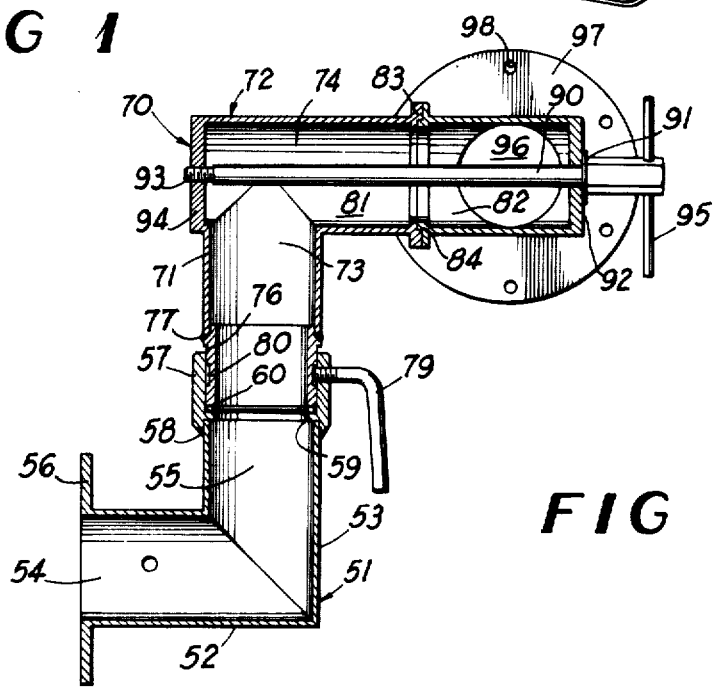

As shown in FIG. 2, the universal mounting structure 50 includes a first conduit means 51 having a pair of angularly disposed conduit portions 52, 53. The conduit portions 52, 53 are connected to each other at substantially right angles to define an entrance passageway 54 and a transfer passageway 55. As shown in FIG. 1, the axial edge of conduit 52 is provided with a radial flange means 56 which is adapted to be connected to the air plenum chamber 13 by conventional threaded bolt connecting means (not shown). The flange means 56 is connected to the air plenum chamber whereby the conduit chamber 53 is vertically oriented, as shown in FIG. 1. The upper extending end of conduit portion 53 is provided with a collar 57. Collar 57 is connected to the upper edge of conduit portion 53 by conventional welding means 58. The weld 58 extends circumferentially around the collar for connecting the collar in an air seal relationship relative to conduit portion 53. Collar 57 is provided with an inwardly directing radial flange 59 which will provide a shoulder portion for supporting a sealing ring 60.

As shown in FIG. 2, the universal mounting structure 50 includes a second conduit means generally represented by the reference numeral 70. The second conduit means includes a pair of angularly disposed conduit portions 71, 72 which are connected in right angular relationship relative to each other to define a transfer passageway 73 and an exit passageway 74. The conduit portion 71 includes a downwardly extending support portion 76 which is connected to conduit portions by conventional weld means 77. The downwardly extending portion 76 is detailed in outside dimension to be concentrically received in the collar 57. The axial edge of downwardly extending portion 76 is supported on the sealing ring 60 whereby an air sealed relationship will be provided between collar 57 and extended portion 76. The collar 57 and extended portion 76 will permit angular adjustment of the conduit means 70 relative to conduit means 50 about a substantially vertical axis which coaxial with the passageways 55, 73. The conduit means 70 is secured in an angularly adjusted position by means of an L-shaped locking screw member 79. The L-shaped locking screw member 79 is threadably received within collar 57 and includes an extended end which is received within an angular groove 80 formed on the extended conduit portion 76. Locking screw member 79 will operate to retain the conduit means 70 in an axially set position relative to the conduit means 51 and will permit angular adjustment relative thereto and allow the conduit means to be secured in an angular adjusted position.

As shown in FIG. 2, the second conduit portion 72 is constructed of a pair of conduit sections, 81, 82. Conduit section 81 is provided with a radial flange 83 having an inwardly recessed axially extending shoulder detailed for receiving a complementary axially extending shoulder portion provided on radial flange 84 formed integrally with the second conduit section 82. The complementary axial shoulder portions formed on flanges 83, 84 will serve to support the conduit sections 81, 82 in coaxially connecting relationship and will permit an angular adjustable airtight connection therebetween. The conduit sections 81, 82 can be angularly adjusted relative to each other about a common horizontal axis which is oriented substantially at right angles to the vertical axis formed by conduit portions 53, 71. The axis of conduit sections 81, 82 will also pass through a common plane with the vertical axis mentioned above. The conduit sections 81, 82 can be secured in a selected angular adjusting position by an elongated adjustable tension rod 90. The elongated tension rod 90 includes a shoulder portion 91 supported in an abutting engagement with the second conduit section end wall 92. An opposite end of tension rod 90 is provided with a conventional external threaded portion 93 which is received within complementary threads formed in the first conduit section end wall 94. The tension rod 90 is provided with an adjustment link 95 which is operable for clamping the conduit sections 81, 82 in a selected angular adjusted position relative to each other.

As shown in FIG. 2, the second conduit section 82 includes an exit port 96 which will permit air pressure passing through conduit means 51, 52 to be discharged into the discharge head 40. The discharge head 40 is secured to a radial flange 97 fixed to the second conduit section 82. Flange 97 includes a plurality of openings 98 which are operable for receiving conventional threaded bolt connecting means for securing the discharge head to the universal mounting structure 50.

In an assembled relationship as shown in FIG. 1, air pressure developed within the air plenum chamber 13 will enter the entrance passageway 54, pass along the transfer passageways 55, 73 and will be transferred along the exit passageway 74 for discharge through exit opening 96 and into the discharge head 40. The adjustable mechanism including locking screw means 79 and adjustable tension rod 90 will permit discharge head 40 to be rotated through to a selected angularly adjusted position about a vertical axis and will also permit selected angular adjustment of the discharge head about a substantially horizontal axis.

As shown in FIG. 1, air pressure developed within the passageway 54 is transferred by an air pressure line 34 to the insecticide supply tank 30. The insecticide within supply tank 30 is transferred to a meter control valve 35 and a supply line 36 to the discharge head 40.

The fog generator 10 including meter control valve 35 are controlled in a fog generating operation by means of a remote control means which is located in the cab portion of a carrier vehicle. The fog generator 10 is supported in the rear of the vehicle for discharging a fog mixture including insecticide over a predetermined area.

It now becomes apparent that the above described fog generator including the universal mounting structure 50 is capable of obtaining the above stated objects and advantages. It is obvious that those skilled in the art may make modifications in the details of construction without departing from the spirit of the invention which is to be limited only by the scope of the appended claims.

What is claimed is:
1. A fog generator comprising:
   a. an air blower means;
   b. a conduit connected to said air blower means, said air blower means discharging air into said conduit;
   c. a generally flat nozzle having a relatively small central opening with respect to the size of the nozzle, said nozzle being carried by said conduit, said conduit directing air from said air blower conduit and then through said central opening of said nozzle; and
   d. means for introducing a liquid into said nozzle for mixing with the air passing through said nozzle;
   e. said conduit including:
      i. a first conduit means having a first conduit portion connected by one end to and communicating with said air blower means, said first conduit means extending generally horizontally from said air blower means,
      ii. said first conduit means including a second conduit portion extending from and communicating with said first conduit portion, said second conduit portion opening generally in an upright direction,
      iii. a second conduit means including a generally upright third conduit portion secured by its lower end to the open upper end of said second conduit portion, said third conduit portion being disposed coaxially with and communicating with and being rotatable with respect to said second conduit portion,
      iiii. said second conduit means including a fourth conduit portion connected to and communicating with said third conduit portion, said fourth conduit portion opening sidewise of said third conduit portion and forming with said third conduit portion an elbow,
      iiiii. a nozzle supporting conduit section rotatably connected to and communicating with and carried by the open end of said fourth conduit portion, said nozzle supporting conduit section having an open outer end opening sidewise of said fourth conduit section, said nozzle being secured to and extending radially across the open outer end of said nozzle supporting conduit section for essentially closing the outer end of said conduit section so that substantially all of the air directed through said nozzle supporting conduit section passes through the central opening of said nozzle.

2. The fog generator defined in claim 1 wherein said air blower means includes an air pressure development means having a pressure chamber within which air pressure is developed, said pressure chamber communicating with said head, motor means for driving said air pressure development means, control means for controlling said motor means, a fuel supply tank connected to said motor means for supplying fuel thereto.

3. The fog generator defined in claim 1 including an insecticide supply tank for supplying insecticide to said head, a meter control valve and a supply line from said insecticide supply tank via said meter control valve to said head through which said insecticide is supplied to said head.

4. The fog generator defined in claim 2 including an insecticide supply tank for supplying insecticide to said head, a meter control valve and a supply line from said insecticide supply tank via said meter control valve to said head through which said insecticide is supplied to said head.

5. The fog generator defined in claim 3 wherein said meter control valve is remote from said head.

6. A fog generator as defined in claim 1 wherein said first and second portions are connected at substantially right angles with each other.

7. A fog generator as defined in claim 6 further characterized in that said third and fourth conduit portions are disposed at substantially right angles relative to each other.

8. A fog generator as defined in claim 1 further characterized in that said first conduit means includes a supporting collar on the end of said second conduit portion, concentrically receiving the lower portion of said third conduit portion, and locking means for locking said third conduit means in selected angularly adjusted positions relative to said second conduit portion, said locking means including a locking screw threadably carried by said collar, an extended end of said threaded screw being received within said annular recess.

9. A fog generator as defined in claim 8 further characterized in that said collar is provided with a radially inwardly directed shoulder portion for limiting the inward axial movement of said third conduit portion, and including a sealing ring positioned between said shoulder portion and the edge of siad third conduit portion for providing an air tight sealing relationship between said first and second conduit means.

10. A fog generator as defined in claim 9 further characterized in that said second conduit means and said second nozzle supporting conduit section include opposed radially extending flanges for coaxially aligning said fourth conduit portion and said nozzle supporting conduit section relative to each other and for permitting angular adjustment therebetween about a common axis.

11. A fog generator as defined in claim 1 including a tension rod extending through said nozzle supporting conduit section and said fourth conduit portion for threadedly engaging one of them and for bearing on the other of them to clamp the opposed flanges together.

12. A fog generator as defined in claim 11 further characterized in that said first and second conduit portions are disposed at a right angle to each other and said third and fourth conduit portions are at a right angle to each other and the axis of said nozzle is at a right angle to said fourth conduit portion, whereby said first and second conduit means are adjustable relative to each other about a vertical axis and wherein said second conduit section of said nozzle supporting conduit means are adjustable relative to each other about a horizontal axis.

* * * * *